United States Patent
Kim et al.

(10) Patent No.: US 6,914,657 B2
(45) Date of Patent: Jul. 5, 2005

(54) LIQUID CRYSTAL DISPLAY

(75) Inventors: Sung Woon Kim, Kyoungki-do (KR); Dong Hae Suh, Daegu (KR); Youn Hak Jeong, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/307,751

(22) Filed: Dec. 2, 2002

(65) Prior Publication Data

US 2003/0103183 A1 Jun. 5, 2003

(30) Foreign Application Priority Data

Dec. 4, 2001 (KR) ................................ 10-2001-0076179

(51) Int. Cl.$^7$ ...................... G02F 1/1368; G02F 1/1343
(52) U.S. Cl. .......................... 349/143; 349/43; 349/110
(58) Field of Search ........................ 349/43, 106, 110, 349/139, 143, 111

(56) References Cited

U.S. PATENT DOCUMENTS

| | | | |
|---|---|---|---|
| 5,654,811 A | 8/1997 | Spitzer et al. | |
| 5,889,567 A | 3/1999 | Swanson et al. | |
| 6,005,266 A | 12/1999 | Forrest et al. | |
| 6,043,800 A | 3/2000 | Spitzer et al. | |
| 6,072,445 A | 6/2000 | Spitzer et al. | |
| 6,140,980 A | 10/2000 | Spitzer et al. | |
| 6,167,169 A | 12/2000 | Brinkman et al. | |
| 6,190,933 B1 | 2/2001 | Shimabukuro et al. | |
| 6,243,149 B1 | 6/2001 | Swanson et al. | |
| 6,365,936 B1 | 4/2002 | Shimabukuro et al. | |
| 6,597,424 B2 * | 7/2003 | Hattori et al. | 349/146 |
| 6,600,540 B2 * | 7/2003 | Yamakita et al. | 349/139 |

* cited by examiner

*Primary Examiner*—Toan Ton
*Assistant Examiner*—Tai Duong
(74) *Attorney, Agent, or Firm*—Ladas & Parry LLP

(57) ABSTRACT

The present invention provides a liquid crystal display having improved screen quality by preventing abnormal light leakage due to ions in a pixel. The present invention comprises: an array substrate whereon a plurality of gate lines and data lines are arranged to be perpendicular to each other, a TFT is formed at the intersection of the lines and a pixel electrode is formed in a pixel region defined by the lines; a color filter substrate combined with the array substrate, whereon a color filter is formed corresponding to the pixel region, a block matrix is formed corresponding to the interface of pixels and a counter electrode is formed on the whole surface including the color filter and the black matrix; and a liquid crystal layer comprising a plurality of liquid crystal molecules interposed between the array substrate and the color filter substrate, wherein the pixel electrode has a rectangular shape and a plurality of acute angle Tips are formed on the edges thereof.

7 Claims, 2 Drawing Sheets

LIQUID CRYSTAL DISPLAY

BACKGROUND OF THE INVENTION

1. Field of the Invention

The present invention relates to a liquid crystal display, and more particularly, to a liquid crystal display having improved screen quality by preventing abnormal light leakage due to ions in a pixel.

2. Description of the Related Art

Compared with Cathode-Ray Tube (hereinafter, referred to as "CRT"), a Liquid Crystal Display (hereinafter, referred to as "LCD") generally has advantages of lightweight, thin structure and low power consumption and therefore, it has been substituted for the CRT in a terminal of information apparatus and video devices. Recently, a LCD having a Thin Film Transistor (hereinafter, referred to as "TFT") as a switching device in each pixel arranged in a shape of matrix has realized a wide viewing angle, thereby preventing a color shift and obtaining a high quality screen. As a result, the TFT-LCD has been widely used as a monitor of laptop and desktop computers and as a TV screen.

Generally, the LCD comprises an array substrate having a structure that a TFT and a pixel electrode are formed in a pixel, a color filter substrate including a color filter and a counter electrode and a liquid crystal layer interposed between the substrates. The LCD realizes a predetermined image by driving liquid crystal molecules according to the voltage applied to the pixel electrode and the counter electrode.

FIG. 1 is a top plan view showing a pixel structure in a conventional LCD. As shown in the drawing, a plurality of gate lines 2 are arranged to be perpendicular to a plurality of data lines 4. A gate insulating layer (not shown) is interposed between them for electrical insulation thereof.

A TFT 10 is formed at the intersection of the gate line 2 and the data line 4 to control driving of each pixel. The TFT 10 includes a gate electrode forming a part of the gate line 2, a semiconductor layer (not shown) formed in a shape of pattern on the gate electrode and a source and a drain electrodes 4a and 4b formed to be overlapped with a part of the semiconductor layer. The source electrode 4a is in a shape of island and the drain electrode 4b is extended from the data line 4.

A protective layer (not shown) is formed on the resulting surface. A pixel electrode 6 made of transparent metal such as Indium Tin Oxide (ITO) is formed in a pixel region defined by the gate line 2 and the data line 4 to be in contact with the source electrode 4a. The pixel electrode 6 is formed in a rectangular shape, thereby forming the same electric field by the same voltage in the whole pixel region.

A color filter substrate is arranged opposite to the array substrate on the upper part thereof. The color filter substrate comprises a red, a green and a blue color filters (not shown) formed corresponding to pixels of the array substrate, respectively, a block matrix 12 formed on the interface of pixels, that is, on the upper part of the gate line 2 and the data line 4, and a counter electrode (not shown) formed on the whole region including the color filter and the black matrix 12.

Although it is not shown in the drawing, a plurality of liquid crystal molecules is interposed between the array substrate and the color filter substrate.

However, the conventional LCD has a problem that a screen quality is lowered due to abnormal light leakage such as afterimage by distorted data signal voltage since ions in the LCD prevent the application of desirable voltage.

That is, during the manufacturing process, ions are added to the LCD that contains ions originally. And, the pixel electrode of the array substrate and the counter electrode of the color filter substrate are formed in a rectangular shape so that there is no region generating more intensive electric field by the same voltage in the whole pixel region.

In this case, when the data signal voltage is applied, ions in the pixel are uniformly adsorbed in the pixel by DC component voltage and then, liquid crystals in the pixel receive a voltage different from the data signal voltage applied by the ions adsorbed in the pixel. As a result, undesirable movements of liquid crystals are caused, thereby generating abnormal light leakage such as an afterimage.

SUMMARY OF THE INVENTION

Accordingly, the present invention has been made in an effort to solve the problems occurring in the related art, and an object of the present invention is to provide a LCD having an improved screen quality by preventing abnormal light leakage due to ions in the LCD.

In order to achieve the object, the present invention comprises: an array substrate whereon a plurality of gate lines and data lines are arranged to be perpendicular to each other, a TFT is formed at the intersection of the lines and a pixel electrode is formed in a pixel region defined by the lines; a color filter substrate combined with the array substrate, whereon a color filter is formed corresponding to the pixel region, a block matrix is formed corresponding to the interface of pixels and a counter electrode is formed on the whole surface including the color filter and the black matrix; and a liquid crystal layer comprising a plurality of liquid crystal molecules interposed between the array substrate and the color filter substrate, wherein the pixel electrode has a rectangular shape and a plurality of acute angle tips are formed on at least one of the edges thereof.

The tip is formed on the edges of one or more pixel electrodes adjacent to the data line or the gate line and preferably each edge of the rectangularly shaped pixel electrode comprises at least four, and up to eleven, acute angle tips. Preferably, each tip is arranged in the black matrix region.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
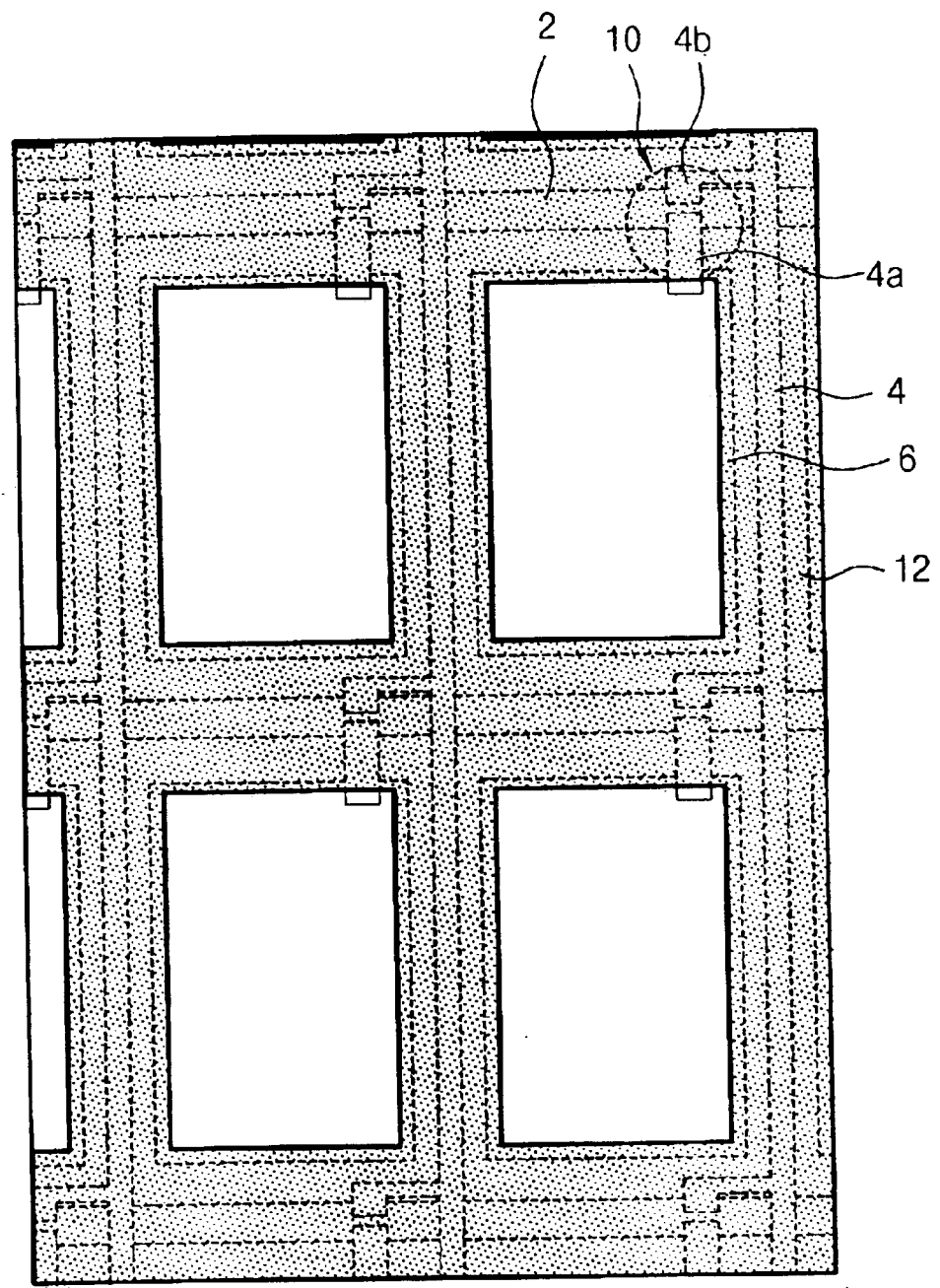
FIG. 1 is a top plan view showing the structure of pixel in a conventional LCD.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
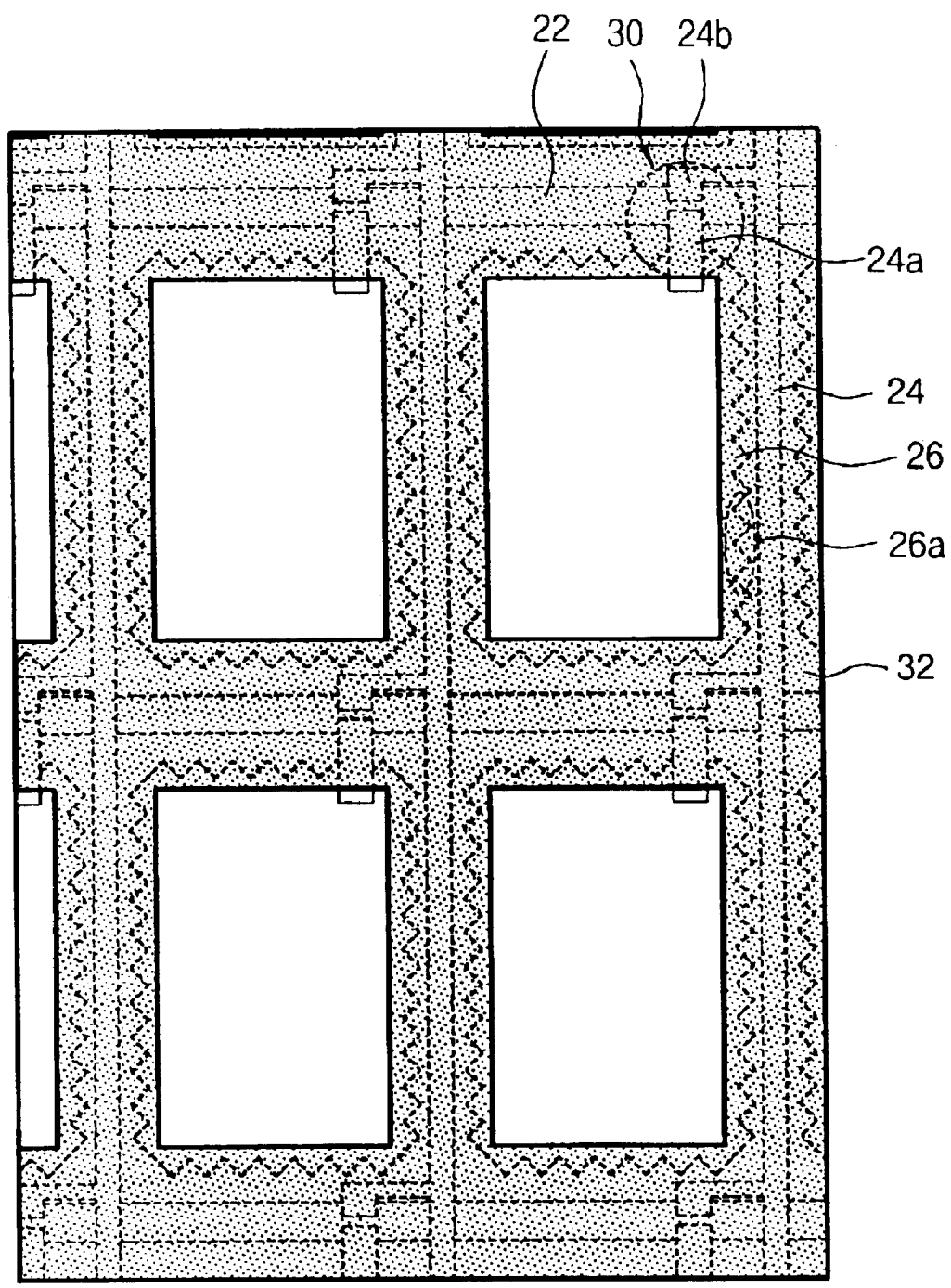
FIG. 2 is a top plan view showing the structure of pixel in the LCD according to the present invention.

FIG. 2 is a top plan view showing the structure of pixel in the LCD according to the present invention.

Referring to FIG. 2, a plurality of gate lines 22 and data lines 24 are arranged to be perpendicular to each other. A gate insulating layer (not shown) is formed between the gate line 22 and the data line 24 for electrical insulation thereof.

A TFT 30 is formed at the intersection of the gate line 22 and the data line 24. The TFT 30 includes a gate electrode forming a part of the gate line, a semiconductor layer (not shown) formed in a shape of pattern on the gate electrode, and source/drain electrodes 24a and 24b overlapped with the ends of one and the other sides of the semiconductor layer. The source electrode 24a is formed in a shape of island and the drain electrode 24b is formed in a shape extended from the data line 24.

A protective layer (not shown) is formed on the resulting structure to protect the TFT 30. A pixel electrode 26 made of transparent metal such as ITO is formed in a pixel region defined by the gate line 22 and the data line 24 to be in contact with the source electrode 24a.

A color filter substrate is arranged opposite to the array substrate on the upper part thereof. The color filter substrate comprises a color filter (not shown) formed corresponding to each pixel, a black matrix 32 formed on the upper part of the gate line 22 and the data line 24 corresponding to the interface of pixels, and a counter electrode (not shown) formed on the whole region including the color filter and the black matrix.

A liquid crystal layer comprising a plurality of liquid crystal molecules is interposed between the array substrate and the color filter substrate.

The pixel electrode 26 is fanned generally in a rectangular shape and a plurality of acute tips is formed on the edge thereof. The Bach acute tip 26a is formed in the black matrix 32 region, that is, the region shielded by the black matrix 32 when a user views the LCD from the front of the color filter substrate. The acute tip tins 26a are formed desirably on one or more regions adjacent to the gate line 22 or the data line 24, and preferably comprise at least four and up to eleven acute angled tips.

As a result, the present invention can prevent abnormal light leakage due to ions by inducing the region where a distortion of data signal voltage is generated to black matrix region not shown to the user.

As described above, the LCD of the present invention can prevent distortion of liquid crystal driving voltage generated by long-time driving and DC component voltage application since the ions in the LCD are moved to the inner side of the black matrix and therefore, it is possible to improve a screen quality.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display comprising:
    an array substrate whereon
        a plurality of gate lines and data lines are arranged to be perpendicular to each other,
        a TFT is formed at the intersection of the lines, and
        a pixel electrode is formed in a pixel region defined by the lines; a color filter substrate combined with the array substrate, whereon
        a color filter is formed corresponding to the pixel region,
        a black matrix is formed corresponding to the interface of pixels and
        a counter electrode is formed on the whore surface including the color filter and the black matrix; and
    a liquid crystal layer comprising a plurality of liquid crystal molecules interposed between the array substrate and the color filter substrate,
    wherein the pixel electrode has a rectangular shape and
    wherein two or more edges of the pixel electrode adjacent and without protruding into the gate line or the data line are formed with a plurality of acute angle tips overlapping the black matrix region.

2. The liquid crystal display according to claim 1, wherein the tips are formed on the edges of one or more pixel electrodes adjacent to the data line or the gate line.

3. A liquid crystal display comprising:
    an array substrate whereon
        a plurality of gate lines and data lines are arranged to be perpendicular to each other,
        a TFT is formed at the intersection of the lines and
        a pixel electrode is formed in a pixel region defined by the lines; a color filter substrate combined with the array substrate, whereon
        a color filter is formed corresponding to the pixel region,
        a black matrix is formed corresponding to the interface of pixels, and
        a counter electrode is formed on the whole surface including the color filter and the black matrix; and
    a liquid crystal layer comprising a plurality of liquid crystal molecules interposed between the array substrate and the color filter substrate,
        wherein the pixel electrode has a rectangular shape end a plurality of acute angle tips are formed on each edge of the rectangular shaped pixel electrodes.

4. The liquid crystal display according to claim 3 wherein the entire perimeter of all four edges of the rectangularly shaped pixel electrode comprises plural acute angle tips.

5. The liquid crystal display according to claim 3 wherein each edge of the rectangularly shaped pixel electrode comprises at least four acute angle tips.

6. The liquid crystal display according to claim 5 wherein each edge of the rectangularly shaped pixel electrode comprises between 4 end 11 acute angle tips.

7. The liquid crystal display according to claim 3 wherein file acute angle tips are formed overlapping the black matrix region.

* * * * *